April 6, 1943.   W. G. THOMPSON ET AL   2,316,116
TANK
Filed Oct. 26, 1939   2 Sheets-Sheet 1
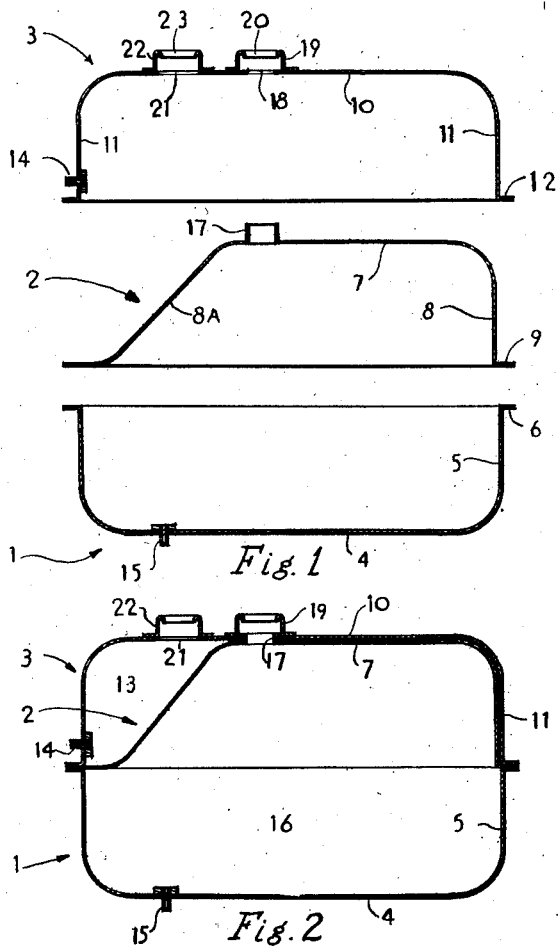
Fig. 1
Fig. 2
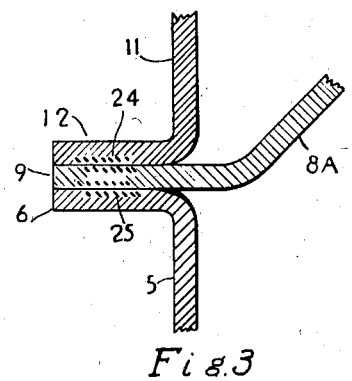
Fig. 3
INVENTORS.
WILLIAM G. THOMPSON
BARTLETT M. KERR
BY Emerson B Donnell
ATTORNEY April 6, 1943. W. G. THOMPSON ET AL 2,316,116
TANK
Filed Oct. 26, 1939 2 Sheets-Sheet 2

INVENTORS
WILLIAM G. THOMPSON
BARTLETT M. KERR
BY Emerson B Donnell
ATTORNEY

Patented Apr. 6, 1943

2,316,116

UNITED STATES PATENT OFFICE 2,316,116

TANK

William G. Thompson and Bartlett M. Kerr, Racine, Wis., assignors to J. I. Case Company, Racine, Wis., a corporation Application October 26, 1939, Serial No. 301,336

4 Claims. (Cl. 220—22)

The present invention relates to tanks and more particularly to fuel tanks and the like for tractors, vehicles, etc., and which are subject to severe vibration and shocks, but which it is nevertheless important, shall not develop leaks.

An object of the invention is to largely avoid seams in the construction of a tank. A further object is to improve the construction of such a tank in which is included more than one fluid compartment.

Further objects are to provide such a tank composed of a plurality of somewhat similar parts; to readily introduce an auxiliary fluid compartment within the confines of the tank as a whole; to avoid any additional seams by reason of the inclusion of such auxiliary compartment; such a construction in which the labor, incident to assembly thereof, is substantially no greater than in a tank without the auxiliary compartment, and other objects looking toward a realization of the above objects.

Further objects and advantages will be apparent from the following specification and accompanying drawings in which:

Figure 1 is a longitudinal vertical sectional view of the component parts of such a tank in position for assembly.

Fig. 2 is a similar view of the completed tank.

Fig. 3 is a detail of certain construction indicated in Fig. 2.

Figure 4:
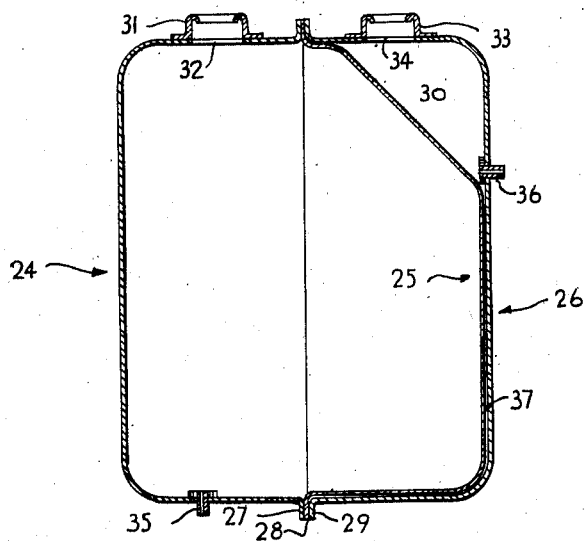
Figure 5:
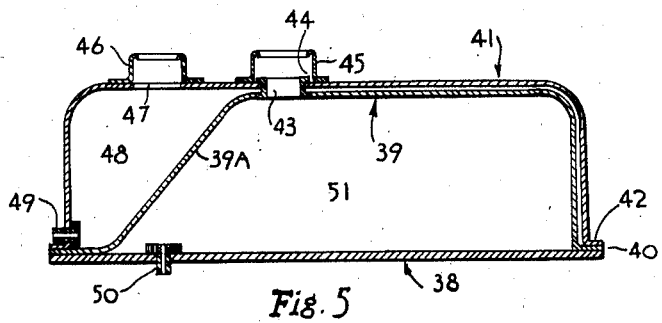
Figure 6:
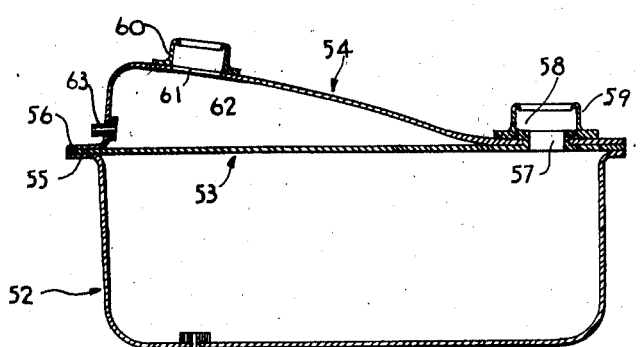

Figs. 4, 5, and 6 are views similar to Fig. 2, of modified constructions embodying the invention.

Similar reference characters have been applied to the same parts throughout the specification and drawings.

As seen in Fig. 1, the tank comprises a bottom portion generally designated as 1, an intermediate portion or partition generally designated as 2, and a top portion generally designated as 3. Portion 1 includes a bottom wall or floor 4, side walls 5 and an upper outwardly extending marginal flange 6, preferably extending completely around side walls 5.

Portion 2 includes a top portion 7, side walls 8, and a lower marginal flange 9, suitably formed to rest on above mentioned flange 6 when the parts are placed together.

Portion 3 also includes a top wall 10, side walls 11, and a lower marginal flange 12 adapted to rest on above mentioned flange 9, side walls 8 and side walls 11 being so proportioned that portion 2 will be completely inclosed in portion 3 when flanges 12 and 9 are placed together in normal position of the parts shown.

In order to provide a space for auxiliary fluid, one or more of the side walls of section 2, as 8ª, may be inclined or otherwise so shaped as to provide a clearance space or auxiliary reservoir 13, Fig. 2, between portions 2 and 3, top portion 7 then being contiguous to top wall 10 of section 3.

The shape or location of this clearance or reservoir is not material, but for convenience it is located at one end of the completed tank in the present instance to facilitate connection with a discharge pipe. For this purpose, a fitting, bushing, or other element of any suitable form 14 is fixed in one of the side walls 11 of section 3, preferably close to flange 12 so as to communicate with reservoir 13 near the bottom thereof. A similar or other suitable fitting or bushing 15 is fixed in a convenient part, as for example, bottom wall 4 of section 1, to facilitate connection of a discharge pipe with main volume 16 of the tank.

Section 2 has a neck 17 extending upwardly from top wall 7 and engageable within an opening 18 in top wall 10 of section 3. A filler neck or fitting 19 is fixed about opening 18 and has an inner flange 20 or other suitable expedient for engaging a filler cap of suitable or well-known form not shown. As shown in Fig. 2, when the parts are placed together, neck 17 extends into fitting 19 and may be outwardly flared and given a fluid tight connection with upper wall 10 as by soldering, welding, or other well-known process.

An opening 21 is provided in upper wall 10 in position to communicate with reservoir 13, and has a filler neck 22 provided with an inner flange or other means 23 for engaging a filler cap of suitable or well-known form not shown.

After sections 1, 2 and 3 are placed together in relations shown in Fig. 2, flanges 6, 9 and 12 are secured together as by welding at 24 and 25 in any well-known manner, as for example, by a well-known electric welding process, the parts being in effect united as a single piece of metal. Owing to the arrangement of the parts, a single continuous welding process about the contacting flanges 6, 9 and 12, completes the uniting of the component parts of the tank in inseparable and fluid tight manner in one operation. The inclusion of section 2 within the tank has a tendency to strengthen the whole structure and provides a double compartment tank with very little increase in labor cost over that of producing a single compartment tank.

In practice, although a close approach of walls 8 and 11 and top portions 7 and 10 is desirable, some slight clearance will ordinarily be present between these elements for manufacturing reasons. This due to the resulting dead air or vapor space, will result in a fairly efficient insulating effect between sections 3 and 2. For example, in the event that gasoline is being used in main portion 16 of the tank, this insulation will protect such fluid from the heat of the sun on the upper surface of the tank.

There being only one seam in the whole structure, and this being of a very rugged character, the tank is extremely resistant to damage from vibration, shocks and the like, as well as being lighter, less expensive and more pleasing in appearance than prior constructions.

Ordinarily in operation, main body 16 of the tank can be filled through neck 19 with distillate, "tractor fuel" or the like, which will be transmitted to the tractor engine or other point of use through bushing 15. Gasoline, or other volatile fuel for starting purposes will be placed in portion 13 through neck 22 and will be transmitted to the engine when necessary through bushing 14.

Certain of the advantages of the invention can be realized by means of constructions somewhat different from those just described. Thus, in Fig. 4 is shown an arrangement quite similar to that of Fig. 1, but used in a somewhat different way. A front portion 24, intermediate portion 25, and a back portion 26 having outer marginal flanges 27, 28 and 29 respectively, are placed together in the same manner as described in connection with Fig. 2 but with flanges 27, 28 and 29 in a substantially vertical position. An auxiliary reservoir 30 is provided between portions 25 and 26 and may be placed where convenient by suitably choosing the position of the tank. In the present instance, a filler neck 31 is fitted to an opening 32 in front portion 24, corresponding in a measure to bottom portion 1 of Figs. 1 and 2. A second filler neck 33 is fitted to an opening 34 in portion 26 communicating with auxiliary reservoir 30. In this way either of the compartments of the tank may be filled and the forming of a neck portion, such as 17, Fig. 1, with its accompanying soldering or similar operation may be avoided.

A fitting 35 may be arranged for connection of a discharge pipe with portion 24, providing communication with the main body of the tank and a similar or other suitable fitting 36 may be fixed in portion 26 for connection of a discharge pipe with auxiliary reservoir 30. Fitting 36 may be located, if desired, to communicate with the clearance space 37, between portions 25 and 26, which may possibly result in a more convenient location of fitting 36.

Another possible arrangement of parts utilizing certain advantages of the invention is shown in Fig. 5. In this embodiment a bottom portion 38 is provided which in the present instance is in the form of a flat plate. A partition portion 39 is formed with a lower marginal flange 40 and shaped to fit within an upper portion 41, also provided with a lower marginal flange 42. Bottom 38 is so proportioned as to be substantially coextensive with flange 40, the parts being placed with portion 38, flange 40 and flange 42, together as shown, and welded in one operation as above described in connection with Fig. 2.

Portion 39 has a neck 43 projecting upwardly through a suitable opening in portion 41 and joined thereto at 44 as by soldering or the like, a filler neck 45 being suitably fixed to portion 41 for carrying a filler cap not shown. Another filler neck 46 communicates with an opening 47, leading to an auxiliary reservoir 48 formed by an offset or depressed portion 39ᵃ of portion 39. A fitting 49 provides for connection of a discharge pipe with auxiliary reservoir 48 and a fitting 50 provides for connection with a discharge pipe to the main volume 51 of the tank.

Fig. 6 shows a somewhat similar modified construction, including a main or bottom portion 52, an intermediate or partition portion 53, in the present instance in the form of a flat plate, and an upper portion 54. Portion 52 has an upper marginal flange 55, and portion 54 has a lower marginal flange 56 which contact the margins of plate portion 53 and are welded thereto when the portions are placed together in the completed tank. Portion 53 has a neck portion 57 extending through an opening in portion 54 and united thereto at 58, a filler neck 59 being fixed with portion 54 about neck 57 as described in the case of Fig. 5. A filler neck 60 communicates with an opening 61 leading to an auxiliary reservoir 62 provided by the shape of portion 54. As in the case of the other figures, portion 54 has a fitting 63 for connection of a discharge pipe, and portion 52 has a similar or suitable fitting 64 for connection of a discharge pipe.

The advantages of the invention are thought to be apparent from this description. It is pointed out, however, that in the various embodiments shown, the major operation in assembling any of the tanks is the placing together of the several margins or marginal flanges and uniting them in a single simple operation as by welding. The difficulty and the amount of labor in manufacturing such a tank with two compartments is therefore substantially no greater than that of making a single compartment tank of similar dimensions. The invention lends itself to a variety of different embodiments without sacrificing the advantage of easy and rapid assembly.

The joint formed at the marginal flanges becomes to all practical purposes a single solid piece of metal, adding greatly to the strength of the tank by providing a reinforcing rib completely thereabout. There is nothing to work loose or crack in response to vibration, and there is no relatively weak seam in the tank which might allow the tank to burst open and release its contents in the event of a severe blow, such as might be encountered in an accident.

The above being a complete description of illustrative embodiments of the invention, what is claimed as new and desired to be secured by Letters Patent of the United States is:

1. A tank including a first section, an intermediate section and a second section, each of said sections having a circumferential marginal flange, said intermediate section being shaped to fit within said second section and having a portion spaced therefrom when so fitted to provide an auxiliary chamber, and a portion contiguous with the first section, said marginal flanges being permanently united, means including an opening through the first section and the contiguous portion of the second section for supplying a fluid to said tank and separate means for supplying a fluid to said auxiliary chamber.

2. A tank including a first section, an intermediate section and a second section, each of said sections including walls defining an opening, and each of said sections having a flange encompassing said opening, said intermediate section being shaped to project within said second section, and providing a clearance space constituting an auxiliary chamber between said intermediate and said second sections, and said flanges being permanently united, said second section having a portion contiguous with said first section, means for supplying fluid to said tank including an opening through said first portion and said contiguous portion and means for supplying fluid to said auxiliary chamber.

3. In a two-compartment tank, an upper portion, an intermediate portion adapted to telescope into said upper portion with a clearance space forming an auxiliary chamber between it and said upper portion, and a lower portion, said portions having out-turned flanges, a plurality of filler openings in the upper portion and a filler opening in the intermediate portion, said intermediate portion and said upper portion being permanently united at the opening in the intermediate portion and at a location such that said opening registers with one of the openings in the upper portion, and said flanges being permanently united with each other, an outlet fitting on the upper portion communicating with said clearance space and an outlet fitting on the lower portion communicating with the space enclosed by said intermediate portion and said lower portion.

4. In a two-compartment tank for a tractor, a one-piece upwardly dished upper portion, an upwardly dished intermediate portion adapted to telescope into said upper portion but having an offset providing a clearance space at one side of the upper portion forming an auxiliary chamber, a downwardly dished lower portion, said portions having out-turned flanges, a plurality of filler openings in the upper portion and a filler opening in the intermediate portion, said upwardly dished upper portion and said outwardly dished intermediate portion approaching each other and being permanently united at the filler opening in the intermediate portion, and at a location such that said opening registers with one of the filler openings in the upper portion, and said flanges being welded to each other, an outlet fitting on the upper portion communicating with said clearance space, and an outlet fitting on the lower portion communicating with the space enclosed by said intermediate portion and said lower portion.

WILLIAM G. THOMPSON.
BARTLETT M. KERR.